Nov. 25, 1958   R. O. RUFF   2,861,394
FORMING GLASS ARTICLES
Filed Sept. 2, 1953
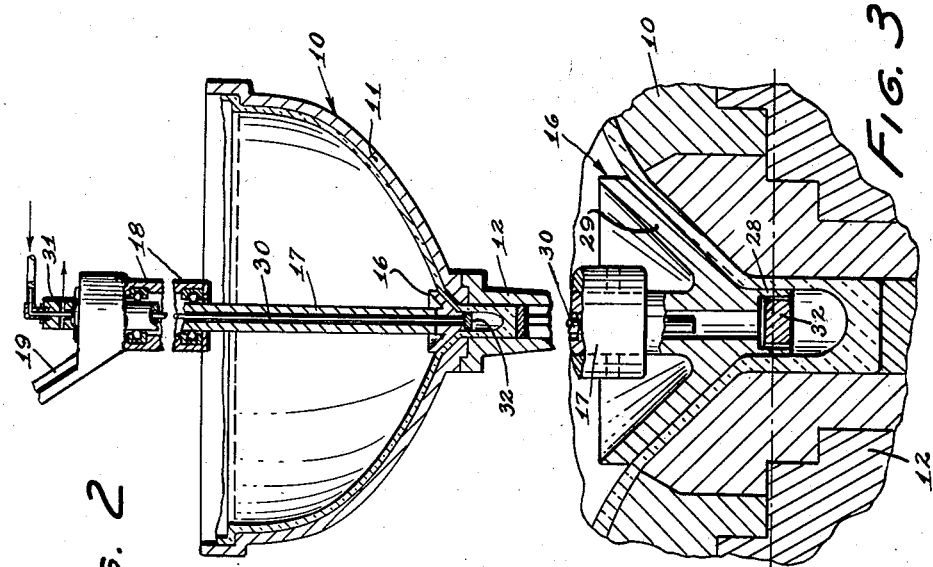
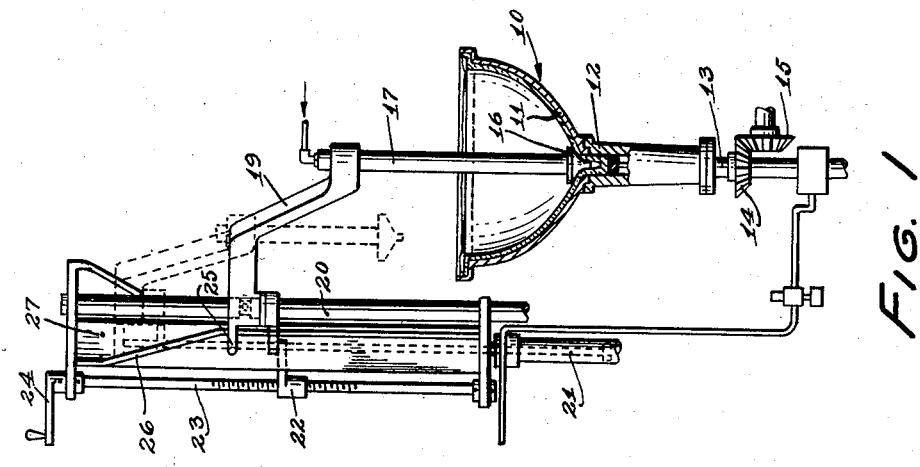
RICHARD O. RUFF
Inventor
By Rule and Hoge.
Atty.

2,861,394
FORMING GLASS ARTICLES

Richard O. Ruff, Toledo, Ohio, assignor to Owens-Illinois Glass Company, a corporation of Ohio Application September 2, 1953, Serial No. 378,093

2 Claims. (Cl. 49—29)

This invention relates to the manufacture of hollow articles by centrifugal action and, more particularly, to the manufacture of hollow glass funnels for cathode ray tubes.

As presently manufactured, cathode ray tubes are made by separately fabricating a glass face plate and a hollow funnel. These parts are subsequently sealed together. More recently the hollow funnel has been made by centrifugal action wherein a charge of glass is deposited in the apex of a hollow mold and the mold is rotated about its axis to form the hollow funnel. A short tubular portion is usually formed integral with the hollow funnel and is subsequently severed and replaced by a longer tubular portion. The above steps are followed in making both the circular and rectangular cathode ray bulbs. As the size of the bulbs is increased due to the demand for larger size screens on cathode ray bulbs, such as, for example, for television receivers, the problem of glass distribution in the walls of the funnel has been increasingly difficult, particularly in the portion of the funnel near the apex thereof and merging with the tubular portion. If the thickness is excessive or non-uniform, satisfactory clearance of the cathode ray or beam is not obtained.

It is, therefore, an object of this invention to provide a method and apparatus which will insure proper beam clearance in cathode ray tubes formed by centrifugal action.

Other objects of the invention will appear hereinafter.

Basically, the invention comprises applying a pressure in the area of the apex of the hollow funnel as it is being formed by centrifugal action in order to simultaneously obtain a tubular extension and glass area adjoining said tubular extension having predetermined dimensions.

Referring to the accompanying drawings:

Fig. 1 is a part-sectional, elevational view of an apparatus by which the invention may be performed;

Fig. 2 is an enlarged view of a portion of the apparatus shown in Fig. 1; and

Fig. 3 is an enlarged view of a portion of the apparatus shown in Fig. 2.

As shown in Fig. 1, a mold 10, formed with a hollow body 11 and a short tubular stem or extension 12, is mounted on a vertical rotary shaft 13 for rotation therewith about its vertical axis. The shaft 13 is rotated through bevelled gears 14 and 15 driven by a motor or other source of power (not shown). A pressing tool 16 is mounted for movement into and out of the mold, as presently described. The tool 16 is mounted on a hollow shaft 17. The shaft 17 is in turn mounted for free rotation in an arm 19 by means of bearings 18. The arm 19 is mounted for vertical reciprocating movement on a stationary shaft 20 and is actuated by linkage to a reciprocating piston 21. The piston 21 may be powered mechanically or pneumatically. The downward movement of the arm 19 is limited by an adjustable stop 22 threadedly mounted on journalled shaft 23. The position of the stop may be adjusted by rotating the shaft 23 through handle 24.

The arm 19 is provided with a cam follower 25 riding in the groove 26 in a cylindrical cam 27. By this arrangement the arm 19 and in turn the pressing tool 16 is caused to swing out of register with the mold as the tool is retracted. This permits deposit of a charge of molten glass in the mold. Referring to Figs. 2 and 3, the pressing tool 16 comprises a short cylindrical section 28 integral with and merging into a generally frusto-conical section 29 similar to the shape of the apex of the funnel. The hollow shaft 17 is provided with a cooling tube 30 through which cooling air may be forced to cool the shaft. The air flows down through the tube 30 and back up through the shaft 17 and leaves the shaft through openings 31. A small portion of the air may leave through the serrated plug 32 in the base of the pressing tool 16.

The air may be adjusted in any suitable manner. It has been found that the amount of cooling air governs the size of the air pocket formed in the tubular portion immediately below the end of the pressing tool (Fig. 3). By using insufficient cooling air, the air pocket may be too small and the pressing tool may press solidly against the glass and make the glass more susceptible to checking. In addition the glass may adhere to the tool. By using too much cooling air, the air pocket may be too large and the glass may crizzle.

It can thus be seen that the cooling air serves not only to cool the tool but also to form the proper size air pocket below the end of the tool.

According to the method a charge of molten glass is deposited into the hollow mold, while the mold is stationary or rotating at a very slow rate. A short interval of time is allotted in order to permit the charge to settle in the apex of the mold. The mold is then rotated rapidly about its axis in order to distribute the glass along the sides of the mold by centrifugal action. As the mold is rotated the pressing tool 16 is brought into vertical register with the mold and moved downward into contact with the glass, thereby simultaneously pressing the glass in the frusto-conical portion and the tubular portion. As shown in Fig. 3, the glass is simultaneously forced downwardly into the tubular portion and pressed to proper dimensions in the frusto-conical portion and the upper part of the tubular portion. The pressing of the glass provides control of the dimensions of the glass in these areas by chilling to the degree wherein centrifugal force will not affect the glass in these areas. By this simultaneous pressing the required control of the beam clearance is obtained. The excess glass from the pressing is either forced downwardly into the tubular portion or upwardly away from the frusto-conical portion. The latter glass is distributed by centrifugal action along the walls of the hollow funnel.

The rotation of the mold and pressing tool in unison is continued until the hollow article is completed by centrifugal action.

Modifications may be resorted to within the spirit and scope of the appended claims.

I claim:

1. In the method of forming a hollow glass article having a bowl-shaped body with convergent tapering sides, a tubular lower end portion and a frusto-conical portion between said body and said end portion, the steps comprising dropping a charge of molten glass into a hollow mold having an inner molding surface conforming in shape and size to the exterior surface of the article to be molded and including downwardly convergent tapering sides, a tubular lower end part and a frusto-conical part between said sides and end part, allowing the glass to settle in the mold, thereafter accelerating the rotation of said mold about its vertical axis to spread the glass along the sides of the mold and form the body of the article by the action of centrifugal force on the glass, moving a forming tool vertically downwardly along the axis of said mold toward said glass, said tool having a shape and size similar to the shape and size of the interior surface of the frusto-conical portion of the article to be formed and including a lower cylindrical section merging with an upper inverted frusto-conical section, passing air axially downwardly through said tool during its downward movement, moving said tool downwardly while continuing the rotation of the mold and prior to the complete spreading of the glass along the sides of the mold to bring the cylindrical section thereof into contact with the glass to initially force glass downwardly into the tubular part of the mold and thereby form the tubular portion of the article, continuing the downward movement of said forming tool and the application of air therethrough to bring the frusto-conical section of said tool into contact with the glass while maintaining the side surface of said cylindrical section in contact with the glass to entrap a pocket of air below the cylindrical section of said forming tool and within said tubular portion of said article and to force glass from said frusto-conical part of the mold upwardly and downwardly relative to said forming tool to form the frusto-conical portion of the article, and maintaining said frusto-conical section and the sides of said cylindrical section of said forming tool in contact with said glass during the rotation of said mold to cause said glass which has been forced upwardly to become redistributed by the action of centrifugal force.

2. In an apparatus for forming a hollow glass article having a bowl-shaped body with convergent tapering sides, a tubular end portion and a frusto-conical portion between said body and said end portion, the combination comprising a hollow mold mounted for rotation about a vertical axis, said mold having an inner molding surface conforming in shape and size to the exterior surface of the article to be molded and including downwardly convergent tapering sides, a tubular lower end part and a frusto-conical part between said sides and end part, means for rotating said mold about its axis, a forming tool, means for supporting said tool for free rotation about a vertical axis, said tool having a shape and size similar to the shape and size of the interior surface of the frusto-conical part of the mold and including a lower cylindrical section merging with an upper inverted frusto-conical section, means in said tool providing a passageway, means for supplying cooling air to said passageway, said tool having a restricted axial opening therein at the lower end thereof through which said cooling air may pass downwardly, means for moving said tool vertically downwardly along the axis of the mold into contact with the glass in the mold, whereby the lower cylindrical section of the mold initially forces glass downwardly into the tubular part of the mold to form the tubular portion of the article, the frusto-conical section of the tool thereafter contacts the glass while the sides of said cylindrical section of said tool remain in contact with the glass to entrap a pocket of air below the cylindrical section of the tool and within the tubular portion of the article and forces glass from the frusto-conical part of the mold upwardly and downwardly to form the frusto-conical portion of the article.

References Cited in the file of this patent

UNITED STATES PATENTS

| | | |
|---|---|---|
| 687,136 | Drake | Nov. 19, 1901 |
| 1,859,957 | Canfield | May 24, 1932 |
| 2,349,046 | Luertzing | May 16, 1944 |
| 2,662,346 | Giffen | Dec. 15, 1953 |
| 2,696,699 | Giffen | Dec. 14, 1954 |